United States Patent
Langhoff et al.

(10) Patent No.: US 8,646,787 B2
(45) Date of Patent: Feb. 11, 2014

(54) WHEEL SUSPENSION FOR REAR WHEELS OF A MOTOR VEHICLE

(75) Inventors: Hans-Jürgen Langhoff, Lenting (DE); Dominik Mohrlock, Ingolstadt (DE); Florian Adlkofer, Eichstätt (DE); Stephan Lamers, Altmannstein (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/416,641

(22) Filed: Mar. 9, 2012

(65) Prior Publication Data

US 2013/0069330 A1 Mar. 21, 2013

(30) Foreign Application Priority Data

Mar. 10, 2011 (DE) .................. 10 2011 013 484

(51) Int. Cl.
*B60G 7/02* (2006.01)
(52) U.S. Cl.
USPC ............................ 280/86.75; 280/124.134
(58) Field of Classification Search
USPC ............... 280/86.75, 86.754, 86.756, 86.757, 280/86.758, 124.134, 124.138, 124.139
See application file for complete search history.

(56) References Cited

U.S. PATENT DOCUMENTS

| 4,545,602 A | 10/1985 | Shibahata |
| 4,744,586 A | 5/1988 | Shibahata |
| 4,828,279 A | 5/1989 | Matschinsky |
| 4,982,978 A | 1/1991 | Kawasaki |
| 5,845,926 A | 12/1998 | Davis |
| 6,752,409 B1 * | 6/2004 | Kunert ................... 280/124.138 |
| 7,784,806 B2 * | 8/2010 | Schmidt et al. ......... 280/124.134 |
| 7,967,310 B2 * | 6/2011 | Frasch et al. ........... 280/124.143 |

FOREIGN PATENT DOCUMENTS

| DE | 3642421 | 6/1987 |
| DE | 68918375 | 9/1994 |
| DE | 102 21 993 B4 | 11/2003 |
| DE | 69724403 | 6/2004 |
| DE | 102006031001 | 3/2008 |
| EP | 0 284 049 | 9/1988 |
| EP | 0 288 654 | 11/1988 |
| EP | 0 288 6544 A1 | 11/1988 |
| JP | 55001556 U | 1/1980 |
| WO | WO2013075787 A1 * | 5/2013 ............ 280/124.134 |

* cited by examiner

*Primary Examiner* — Faye M. Fleming
(74) *Attorney, Agent, or Firm* — Henry M. Feiereisen LLC

(57) ABSTRACT

A wheel suspension for a rear wheel of a motor vehicle includes a wheel carrier, a lower control arm and a track rod connected to the wheel carrier at first and second points of articulation and supported on a vehicle body by first and second bearings. A rotation movement by the control arm and the track rod in response to longitudinal and/or lateral forces causes a toe-in change to thereby adjust the first point of articulation of the control arm by a first transverse offset in a vehicle transverse direction and adjust the second point of articulation of the track rod by a second transverse offset in the vehicle transverse direction. The first bearing is configured elastokinematically such that the first transverse offset of the first point of articulation is greater than the second transverse offset of the second point of articulation in response to the longitudinal and/or lateral forces.

20 Claims, 2 Drawing Sheets

WHEEL SUSPENSION FOR REAR WHEELS OF A MOTOR VEHICLE

CROSS-REFERENCES TO RELATED APPLICATIONS

This application claims the priority of German Patent Application, Serial No. 10 2011 013 484.0, filed Mar. 10, 2011, pursuant to 35 U.S.C. 119(a)-(d), the content of which is incorporated herein by reference in its entirety as if fully set forth herein.

BACKGROUND OF THE INVENTION

The present invention relates to a wheel suspension for the rear wheels of a motor vehicle.

The following discussion of related art is provided to assist the reader in understanding the advantages of the invention, and is not to be construed as an admission that this related art is prior art to this invention.

The kinematics of toe-in encountered during travel of the motor vehicle is influenced, i.a., by the orientation of the body-side pivot axis of a lower control arm (trapezoidal link) and by the articulation of the control arm to the wheel carrier via two bearings. The leading one of the bearings, positioned anteriorly of the wheel rotation axis, is hereby configured harder in vertical direction (support of the starting force and braking force) than in transverse direction in which the bearings are softer and more resilient.

It would be desirable and advantageous to provide an improved wheel suspension to obviate prior art shortcomings and to enhance toe and camber behavior in particular in the presence of longitudinal and lateral forces acting on the wheels, while yet allowing more freedom in design.

SUMMARY OF THE INVENTION

According to one aspect of the present invention, a wheel suspension for a rear wheel of a motor vehicle includes a wheel carrier, a lower control arm connected to the wheel carrier at a first point of articulation, a track rod connected to the wheel carrier at a second point of articulation, a first bearing for supporting the control arm on a vehicle body, and a second bearing for supporting the track rod on a vehicle body, wherein a rotation movement of the control arm and the track rod in response to longitudinal and/or lateral forces causes a toe-in change to thereby adjust the first point of articulation of the control arm by a first transverse offset in a vehicle transverse direction and adjust the second point of articulation of the track rod by a second transverse offset in the vehicle transverse direction, wherein the first bearing is configured elastokinematically such that the first transverse offset of the first point of articulation is greater than the second transverse offset of the second point of articulation in response to the longitudinal and/or lateral forces.

Adjustment of the first and second points of articulation may hereby involve a shift of the points of articulation to the inside or a pushing thereof to the outside. The circular path described by the first point of articulation of the control arm on the wheel carrier side and the circular path of the second point of articulation of the track rod on the wheel carrier side have thus a position/circle curvature which, for example, may be oriented in such a way that the wheel carrier on the first point of articulation can be pulled inwards to a much greater extent than the second point of articulation of the track rod.

As the inward movement at the second point of articulation is substantially less than the inward movement at the first point of articulation, the elastokinematics of the wheel suspension can be designed with greater degrees of freedom. Moreover, the wheel carrier can toe-in with little or without transverse offset of the second point of articulation so that the track rod can be configured without or with only little sweep in the vehicle transverse direction. As a result, the track rod, when viewed from above, can extend substantially parallel to the wheel rotation axis and the second point of articulation of the track rod on the wheel carrier side and the body-side point of articulation of the track rod may be positioned roughly at a same level in the vehicle longitudinal direction.

According to another advantageous feature of the present invention, the control arm has a center of rotation which can be spaced from the body-side first bearing of the control arm by a distance in the vehicle transverse direction. Advantageously, the center of rotation lies between the control arm and a vehicle centerline. In this way, the afore-mentioned tracking behavior of the wheel suspension can be attained. It is further advantageous, when the center of rotation of the control arm is distanced to the wheel rotation axis.

According to another advantageous feature of the present invention, the first point of articulation may describe in response to the longitudinal and/or lateral forces a circular path in spaced-apart relationship to the center of rotation of the control arm by a radius. Advantageously, the radius can be sized substantially twice as long as a distance between the first point of articulation and an intersection point between the wheel rotation axis and a common body-side pivot axis of the control arm.

According to another advantageous feature of the present invention, the track rod may be arranged in travel direction by a predefined distance behind the control arm.

According to another advantageous feature of the present invention, the second point of articulation can describe in response to longitudinal and/or lateral forces a circular path in which the second point of articulation moves in a movement direction in substantial parallel relation to the vehicle. In accordance with the present invention, the first point of articulation of the control arm on the wheel carrier side, in the other hand, is able to move inwards to a greater degree as the second point of articulation of the track rod on the wheel carrier side.

In accordance with the present invention, the body-side first bearing of the torsionally stiff control arm is configured elastokinematically in such a way that the control arm, as viewed from above, executes in the presence of longitudinal forces or lateral forces acting on the wheel carrier a rotation movement having a center of rotation which lies outside of the body-side bearing in a direction of the vehicle centerline. As a result, the control arm executes a targeted (limited) rotation about a vertical axis or center of rotation in response to longitudinal forces/lateral forces, whereby the first point of articulation, i.e. the harder bearing between the wheel carrier and the control arm, migrates backwards to thereby effect a beneficial toe-in change. The geometric position of the center of rotation can be used to additionally control the wheel position in the presence of longitudinal forces and lateral forces on the wheel.

According to another advantageous feature of the present invention, the center of rotation of the control arm may be positioned anteriorly of the wheel rotation axis by a distance when the harder bearing of the control arm on the wheel carrier side is located roughly in the wheel rotation axis or there behind.

Depending on the distance between the center of rotation of the control arm and the wheel rotation axis, the extent of toe-in in response to a lateral force on the vehicle wheel can be influenced in a desired manner. The distance reflects a lever arm length between the lateral force acting on the control arm and the center of rotation. The torque acting on the control arm in response to the lateral force thus depends on the distance between the center of rotation of the control arm and the wheel rotation axis. In other words, a decrease in the distance results in a lesser adjustment of the toe-in of the vehicle wheel in comparison to a greater distance in which the control arm rotates at greater torque about the center of rotation at same lateral force.

Furthermore, depending on the spacing or radius between the wheel-side harder bearing (point of articulation) and the center of rotation, the impact of the wheel longitudinal forces upon the toe-in change can be controlled in a targeted manner. Advantageously, the spacing may be approximately twice the size or greater than the effective lever between this support point and the common body-side pivot axis of the control arm. As a result, longitudinal resiliency of the control arm can be adjusted in a simple manner to allow realization of a beneficial toe-in curve in combination with lateral forces that may be encountered at the same time.

In general, an increase in the spacing results in a smaller inward transverse movement and thus in a lesser toe-in change when a longitudinal force is applied on the wheel.

According to another advantageous feature of the present invention, the common body-side rotation axis of the control arm may be aligned with a sweep to the outside and forms with the pivot axis of the control arm on the wheel carrier side an intersection point by which anti-squat and anti-dive can be controlled.

The bearings on the control arm to establish the elastokinematics may involve, for example, a combination of ball-and-socket joints and bush joints. Currently preferred however is an implementation of the bearings as modified rubber-metal bush bearings, each defined by a rotation axis, wherein the rotation axes of the bearings extend in a V-shaped configuration towards the intersection point which is oriented to the outside toward the wheel carrier. The bearings are structurally configured to avoid the presence of localized excess stress (strain) in the event of encountered pivot angles of the control arm that allow however in the presence of longitudinal forces a respective rotation movement about the set center of rotation.

According to another advantageous feature of the present invention, the rubber-metal bush bearing may be configured to be softer (more resilient) in an axial direction than in a radial direction to permit the rotation movement of the control arm about the center of rotation. The resilient elements of the rubber-metal bush bearing may hereby extend between defined stops so as to be subjected to thrust only in an axial direction and to compression only in a radial direction. In this way, the control arm can sufficiently rotate within a limited range, without imposing too much strain on the bearing elements in borderline situations (excess stress).

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
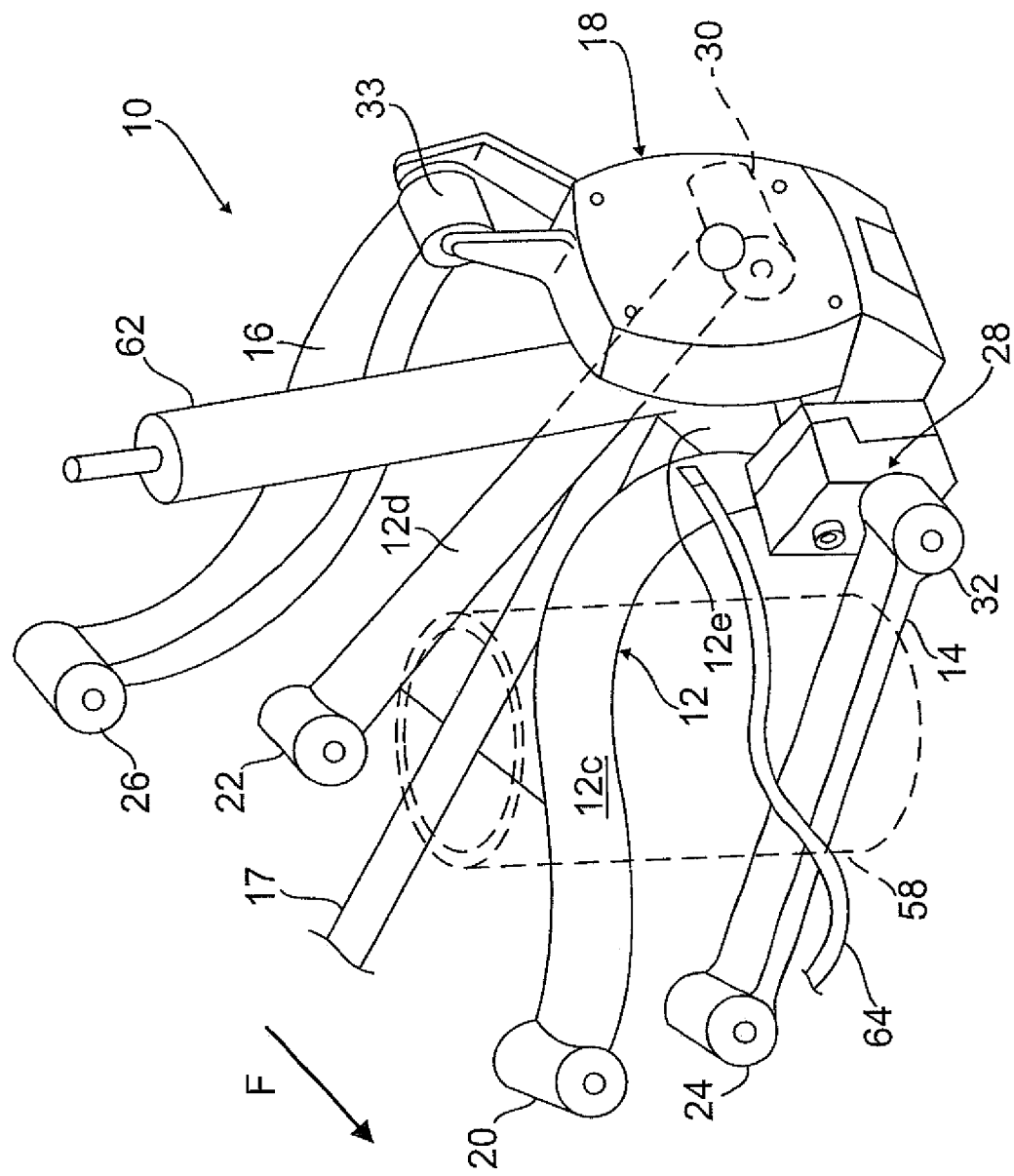
FIG. 1 is a simplified perspective illustration of a wheel suspension for powered or non-powered rear wheels of a motor vehicle.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified perspective illustration of a basic structure of a left-hand wheel suspension, generally designated by reference numeral 10 for rear wheels of a motor vehicle. The wheel suspension 10 essentially includes a lower torsion-resistant control arm 12 (or trapezoidal link), two further individual links 14, 16 positioned more or less above the control arm 12, and a wheel carrier 18. A rear wheel, not shown in FIG. 1 for ease of illustration, is rotatably supported in the wheel carrier 18 and propelled by a driveshaft 17, shown only in part. Travel in forward direction of the motor vehicle is indicated by way of example with arrow F. In the non-limiting example of FIG. 1, the control arm 12 is comprised of two tubular arm portions 12c, 12d and a connection plate 12e welded in-between the arm portions 12c, 12d.

Figure 2:
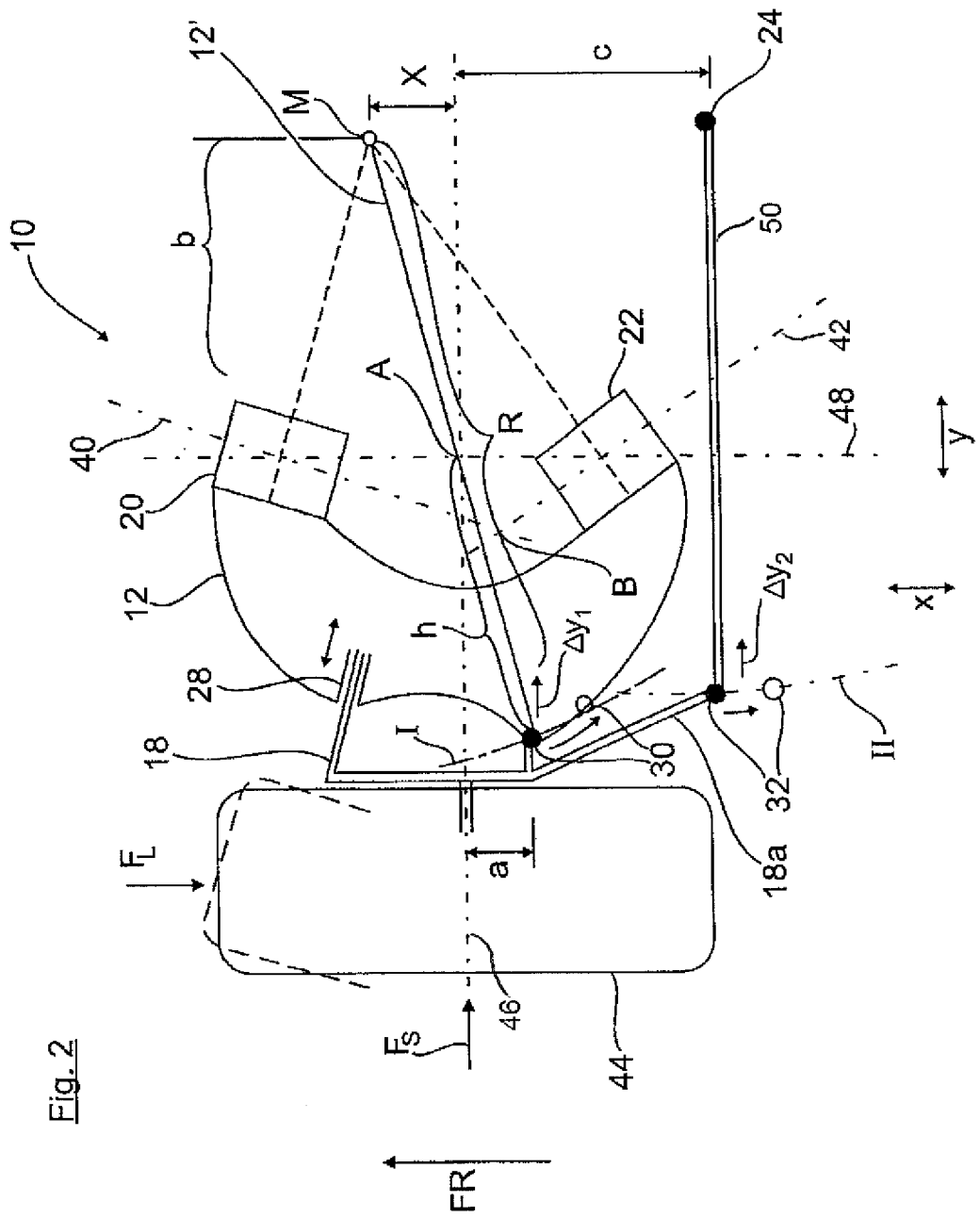
FIG. 2 is a schematic plan view of a lower control arm of a modified wheel suspension in which the control arm is elastokinematically movable about a center of rotation via body-side bearings in the presence of longitudinal forces.

The control arm 12 and the links 14, 16 are articulated to the vehicle body or a subframe of the motor vehicle by bearings 20, 22, 24, 26 in the form of rubber-metal bush bearings, with the bearings 20, 22 of the lower control arm 12 forming a common pivot axis 48 (FIG. 2).

The control arm 12 and the links 14, 16 are further articulated to the wheel carrier 18 by bearings 28, 30, 32, 33, with the bearings 28, 30 of the control arm 12 also defining a common pivot axis on the wheel carrier side. Both pivot axes (not shown in FIG. 1) of the control arm 12 extend in converging relation to the travel direction F of the motor vehicle.

The bearings 30, 32, 33 are also configured as rubber-metal bush bearings, whereas the bearing 28 positioned anteriorly of the wheel rotation axis is configured as a combined bearing having a harder characteristic in vertical direction and a more resilient or softer characteristic in transverse direction of the motor vehicle than the bearing 30 of the control arm 12 positioned behind the wheel rotation axis. An example of such a combined bearing is described in German patent publication DE 102 21 993 to which reference is made herein.

As further indicated schematically in FIG. 1, the wheel suspension 10 includes a telescopic shock absorber 62 which is connected to the wheel carrier 18, a support spring 58, indicated by dashed line, and a stabilizer 64 to connect the wheel suspensions on both sides of the motor vehicle.

Referring now to FIG. 2, there is shown, by way of an analogous model, a schematic plan view of the lower torsionally stiff control arm 12 which is articulated to the vehicle body or subframe (not shown) of the motor vehicle by modified bearings 20, 22, whereas the bearings 28, 30 on the wheel carrier side are configured as described above. Thus, the bearing 30, arranged at a distance a slightly behind the indicated wheel rotation axis 46, has a fairly hard characteristic (rigid) and serves as point of articulation for a toe-in change, as will be described hereinafter. The bearing 28 is arranged at a greater distance anteriorly of the wheel rotation axis 46 and is configured (shown only schematically) with a hard characteristic in vertical direction and a soft characteristic (resiliency) in transverse direction, as described above with reference to FIG. 1. The bearing 28 of soft characteristic in transverse direction provides a support of the braking torque. In other words, the bearing 28 provides support in vertical direction but does not or only insignificantly affects the toe-in change of the wheel carrier 18.

The bearings 20, 22 are configured as modified rubber-metal bush bearings having internal rotation axes 40, 42 which are oriented in the shape of a V defined by an intersection point B which points to the wheel carrier 18 so that the control arm 12 rotates about a vertical axis or about a center of rotation M in response to longitudinal forces or lateral forces acting on the wheel 44 (as indicated by arrows) or on the wheel carrier 18. As can be seen, the center of rotation M lies in the vehicle transverse direction y by a distance b inwards of the bearings 20, 22 and faces the vehicle longitudinal axis.

The orientation of the internal rotation axes 40, 42 is not in symmetry with respect to the wheel rotation axis 46 but such that the center of rotation M lies by a distance X anteriorly of the wheel rotation axis 46 and that the spacing R between the harder bearing 30 on the wheel carrier side and the center of rotation M has a length of about twice the distance h between the bearing 30 and an intersection point A between the wheel rotation axis 46 and the common pivot axis 48 of the control arm 12 formed by the two body-side bearings 20, 22.

The pivot axis 48 of the control arm 12 extends forwardly to the outside whereas the pivot axis extending through the bearings 28, 30 of the wheel carrier 18 extends advantageously forwards to the inside.

The bearings 20, 22 which are configured as rubber-metal bush bearings, are softer in axial direction and harder in radial direction so as to ensure precise wheel guidance despite the presence of a defined longitudinal resiliency. The longitudinal resiliency may be limited in a manner not shown in detail by axially acting stops. The rubber-metal bush bearings have resilient elements in the form of rubber-elastic bushes which are predominantly subjected to thrust in an axial direction and to compression in radial direction (transverse direction). The axial resiliency may be limited in a desired manner by stop rings which are under compressive stress.

The rubber-metal bush bearings are constructed in such a way that a movement of the control arm 12 from its construction position via positive or negative pivot angles does not subject the rubber-metal bush bearings to inadmissible strain and hardening.

Provided on the wheel carrier 18 is a pitman arm 18a which projects rearwards and cooperates with a track rod 50 and which is articulated to the body of the motor vehicle at level with the control arm 12 or slightly above. The track rod 50 is supported by the bearings 24, 32, also shown in FIG. 1.

For ease of understanding, the analogous model shown in FIG. 2 indicates in addition to the trapezoidal control arm 12 its theoretic substitute arm 12' by a line which extends from the center of rotation M to the point of articulation 30 on the side of the wheel carrier 18. As can be further seen from FIG. 2, a toe-in change of the rear wheel 44 is caused in response to longitudinal or lateral forces $F_L$, $F_S$ and shown exaggerated by dashed line. In the presence of a toe-in change, the point of articulation 30 of the control arm 12 on the wheel carrier side migrates backwards along a circular path I in opposition to the travel direction FR. At the same time, the point of articulation 32 of the track rod 50 on the wheel carrier side migrates along a circular path II also backwards in opposition to the travel direction FR.

As a result of the particular elastokinematic arrangement of the center of rotation M and the body-side bearings 20, 22 for the control arm 12, the circular path I is significantly more tilted to the inside than the circular path II of the point of articulation 32 for the track rod 50 on the wheel carrier side, as shown in FIG. 2. Thus, the point of articulation 30 for the control arm 12 is drawn inwards at a substantially greater transverse offset $_\Delta y_1$ in response to longitudinal or lateral forces $F_L$, $F_S$ than the point of articulation 32 which is drawn inwards by a smaller transverse offset $_\Delta y_2$ or moves substantially without inward movement in the vehicle longitudinal direction x. In accordance with the invention, the toe-in change can be realized at very small transverse offset $_\Delta y_2$ or without transverse offset of the point of articulation 32. As a result, the track rod 50 can be made compact and with little sweep and can be arranged at a slight distance c in parallel relationship to the wheel rotation axis 46, as shown in FIG. 2.

The kinematics of the wheel suspension 10 with the modification according to FIG. 2 can be adjusted advantageously in addition to conventional measures (characteristic values of the bearings, level lengths, spatial link alignments, etc.) by using the distance X of the center of rotation M and the spacing R which are determinative for the magnitude (track angle) of the wheel position in response to a lateral fore and longitudinal force.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A wheel suspension for a rear wheel of a motor vehicle, comprising:
   a wheel carrier;
   a lower control arm configured in the form of a trapezoid and connected to the wheel carrier at a first point of articulation;
   a track rod connected to the wheel carrier at a second point of articulation;
   a first bearing for supporting the control arm on a vehicle body; and
   a second bearing for supporting the track rod on a vehicle body,
   wherein a rotation movement of the control arm and the track rod in response to longitudinal and/or lateral forces causes a toe-in change to thereby adjust the first point of articulation of the control arm by a first transverse offset in a vehicle transverse direction and adjust the second point of articulation of the track rod by a second transverse offset in the vehicle transverse direction,
   wherein the first bearing is configured elastokinematically such that the first transverse offset of the first point of articulation is greater than the second transverse offset of the second point of articulation in response to the longitudinal and/or lateral forces.

2. The wheel suspension of claim 1, wherein the track rod is configured in at least one of two ways, a first way in which the track rod is arranged substantially without sweep, a second way in which the track rod is aligned towards a wheel rotation axis, when viewed from above.

3. The wheel suspension of claim 2, wherein the track rod extends in generally parallel relation to the wheel rotation axis.

4. The wheel suspension of claim 1, wherein the control arm has a center of rotation which is spaced from the first bearing by a distance in the vehicle transverse direction.

5. The wheel suspension of claim 4, wherein the center of rotation lies between the control arm and a vehicle centerline.

6. The wheel suspension of claim 1, wherein the control arm has a center of rotation which is positioned at a distance anteriorly to a wheel rotation axis.

7. The wheel suspension of claim 6, further comprising a third bearing for supporting the control arm on the wheel carrier and of harder configuration than the first bearing, said center of rotation of the control arm is positioned anteriorly of the wheel rotation axis when the third bearing is located roughly in the wheel rotation axis or there behind.

8. The wheel suspension of claim 1, wherein the control arm has a center of rotation, said first point of articulation describing in response to the longitudinal and/or lateral forces a circular path in spaced-apart relationship to the center of rotation by a radius.

9. The wheel suspension of claim 8, wherein the radius is sized substantially twice as long as a distance between the first point of articulation and an intersection point between a wheel rotation axis and a pivot axis of the control arm.

10. The wheel suspension of claim 1, wherein the second point of articulation describes in response to the longitudinal and/or lateral forces a circular path in which the second point of articulation moves in a movement direction in substantial parallel relation to the vehicle.

11. The wheel suspension of claim 1, wherein the track rod is arranged in travel direction by a predefined distance behind the control member.

12. The wheel suspension of claim 1, wherein the first point of articulation is drawn inwardly by the first transverse offset in the vehicle transverse direction in response to the longitudinal and/or lateral forces.

13. The wheel suspension of claim 1, wherein the second point of articulation is drawn inwardly by the second transverse offset in the vehicle transverse direction in response to the longitudinal and/or lateral forces.

14. The wheel suspension of claim 1, wherein the control arm rotates about a pivot axis which is aligned with forward sweep to the outside.

15. The wheel suspension of claim 1, wherein the control arm includes two control arm members, thereby defining two of said first bearing for support on the vehicle body, each said first bearing being formed by a modified rubber-metal bush bearing defined by a rotation axis, wherein the rotation axes of the two first bearings extend in a V-shaped configuration and intersect at an intersection point which is oriented to the outside toward the wheel carrier.

16. The wheel suspension of claim 15, wherein the rubber-metal bush bearing is configured to be more resilient in an axial direction than in a radial direction to permit the rotation movement of the control arm about a center of rotation.

17. The wheel suspension of claim 15, wherein the rubber-metal bush bearing includes a resilient element which extends between defined stops so as to be subjected to thrust only in an axial direction and to compression only in a radial direction.

18. The wheel suspension of claim 1, wherein the first point of articulation lies roughly in a wheel rotation axis.

19. The wheel suspension of claim 1, wherein the first point of articulation is positioned at a distance behind a wheel rotation axis.

20. The wheel suspension of claim 1, further comprising at least one further individual link.

\* \* \* \* \*

UNITED STATES PATENT AND TRADEMARK OFFICE
CERTIFICATE OF CORRECTION

PATENT NO.       : 8,646,787 B2
APPLICATION NO.  : 13/416641
DATED            : February 11, 2014
INVENTOR(S)      : Hans-Jürgen Langhoff et al.

It is certified that error appears in the above-identified patent and that said Letters Patent is hereby corrected as shown below:

In the Claims

In column 7, line 36 please replace "control member" with "control arm".

Signed and Sealed this
Twenty-fourth Day of June, 2014

Michelle K. Lee
*Deputy Director of the United States Patent and Trademark Office*